Dec. 14, 1937. L. F. WENDEL 2,102,501
BRAKE RELEASE
Filed June 27, 1936 2 Sheets-Sheet 1
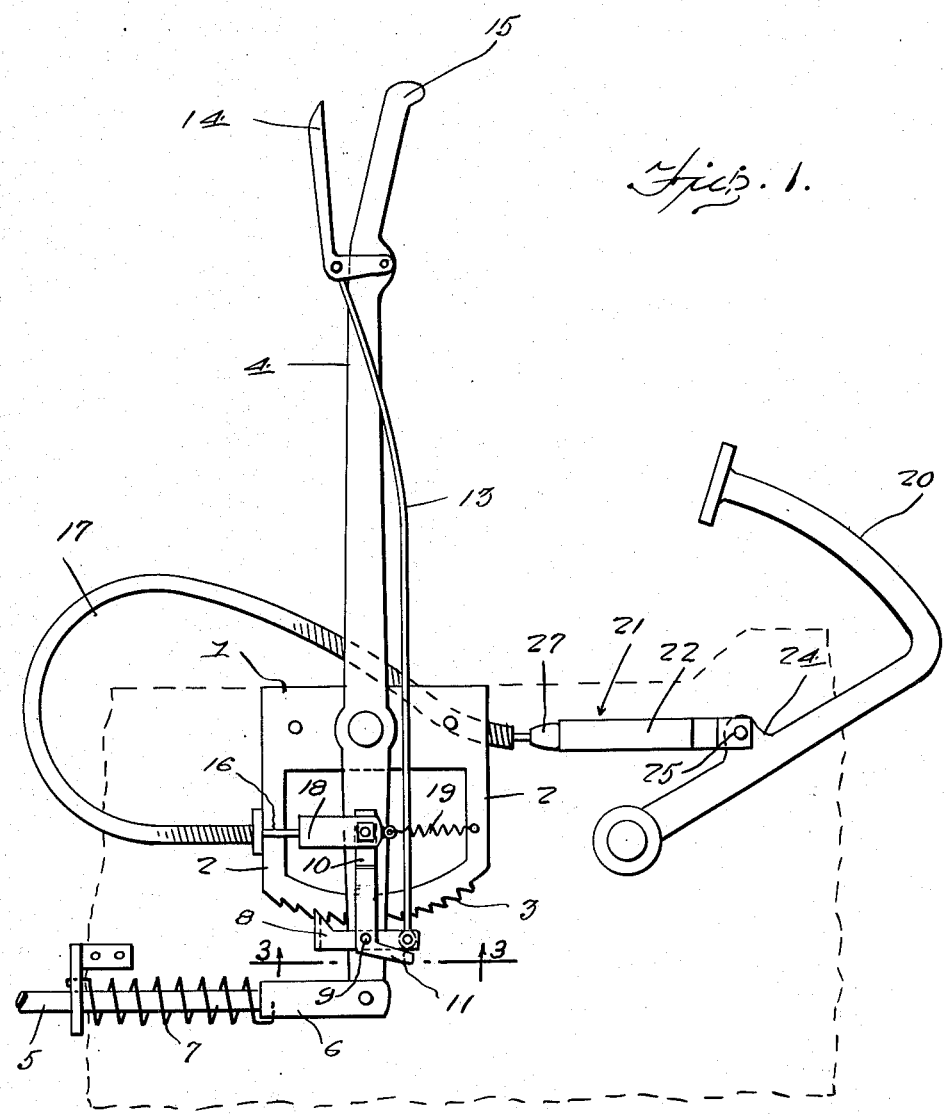
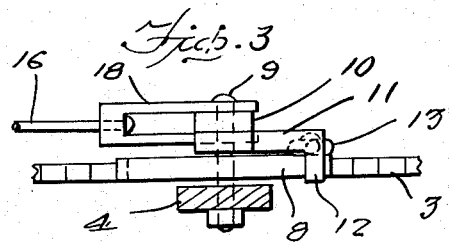
Inventor
L. F. Wendel
By Clarence A. O'Brien
Hyman Berman
Attorneys Dec. 14, 1937. L. F. WENDEL 2,102,501
BRAKE RELEASE
Filed June 27, 1936  2 Sheets-Sheet 2
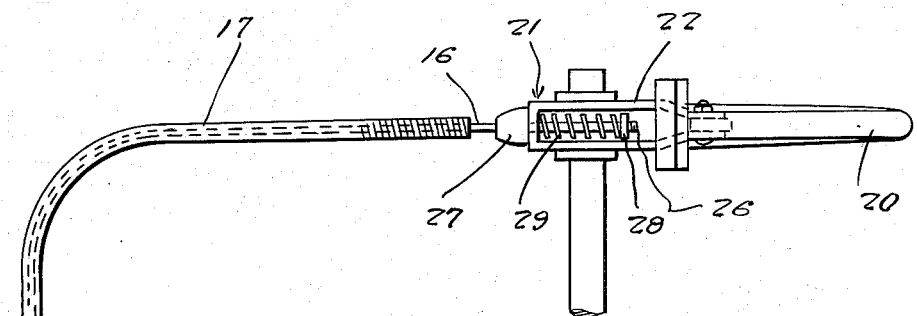
Fig. 2.
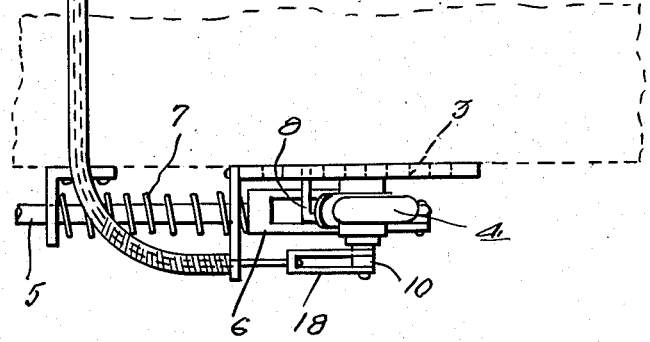
Fig. 4.
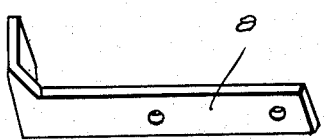
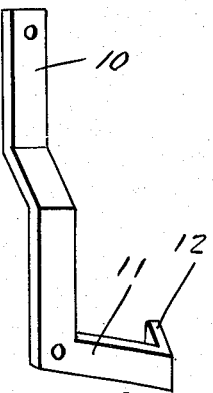
Fig. 5.
Inventor
L. F. Wendel
By Clarence A. O'Brien
Hyman Berman
Attorneys Patented Dec. 14, 1937

2,102,501

UNITED STATES PATENT OFFICE 2,102,501

BRAKE RELEASE

Leo F. Wendel, Ellinwood, Kans.

Application June 27, 1936, Serial No. 87,767

3 Claims. (Cl. 192—13)

The present invention relates to new and useful improvements in brake releases for automobiles and has for its primary object to provide, in a manner as hereinafter set forth, an apparatus of this character embodying a novel construction, combination and arrangement of parts through the medium of which the usual hand brake of the vehicle will be automatically released when the clutch pedal is actuated to disengage the clutch in the usual manner preparatory to putting the car in gear or shifting gears.

Other objects of the invention are to provide an automatic hand brake release of the aforementioned character for motor vehicles which will be comparatively simple in construction, strong, durable, highly efficient and reliable in operation, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation, showing an automatic brake release constructed in accordance with the present invention installed for operation.

Figure 2 is a top plan view thereof.

Figure 3 is a view in horizontal section, taken substantially on the line 3—3 of Figure 1, looking upwardly, as indicated by the arrow.

Figure 4 is a detail view in perspective of the brake lever pawl.

Figure 5 is a detail view in perspective of the brake lever pawl disengaging member.

Referring now to the drawings in detail, it will be seen that the reference numeral 1 designates a rigidly mounted vertical metallic plate having depending therefrom integral legs 2. Extending between the lower end portions of the legs 2 and integral therewith is an arcuate ratchet 3. Pivotally mounted at an intermediate point on the plate 1 is a hand brake lever 4 to the lower end portion of which a brake rod 5 is pivotally connected by a yoke 6. A pull spring 7 is provided for returning the hand lever 4 to inoperative position.

The reference numeral 8 designates a pawl which is pivotally mounted, at an intermediate point, on the lower portion of the hand lever 4 and which is engageable with the ratchet 3 for releasably securing said hand lever in set or operative position. Journaled at its lower end on the pivot 9 of the pawl 8 is a lever 10 from the pivoted lower end of which an arm 11 extends at an angle. The arm 11 terminates in an angularly extending free end portion 12 (see Figure 3) which is engaged beneath the end portion of the pawl 8 which is free of the ratchet 3. Also connected with this end portion of the pawl 8 is the usual rod 13 which is actuated by a bell crank 14 which, as usual, is pivotally mounted on the upper end portion of the hand lever 4 adjacent the handle portion 15 thereof.

The reference numeral 16 designates a flexible operating cable which is enclosed in a suitable flexible housing 17 and which is pivotally connected, at one end, to the upper end portion of the lever 10 by a yoke 18. A pull spring 19 is connected to the pivoted end of the yoke 18. The other end of the flexible cable 16 is connected to the clutch pedal 20 of the vehicle by a coupling which is designated generally by the reference numeral 21.

As illustrated to advantage in Figures 1 and 2 of the drawings, the coupling 21 comprises a clevis 22 the legs of which include inwardly offset free end portions which straddle an ear 24 on the clutch pedal 20 and which are connected thereto by a pin or the like 25. Mounted in the clevis 22 and extending slidably through the closed end thereof is a rod 26 having a head 27 on its rear end in which the flexible cable 16 is anchored. Threaded on the forward end portion of the rod 26 is a nut 28. A compression spring 29 encircles the rod 26 and has one end engaged with the closed end of the clevis 22 and its other end engaged with the nut 28.

It is thought that the operation of the invention will be readily apparent from a consideration of the foregoing. The hand lever 4 is actuated in the usual manner to apply the brakes of the vehicle when said vehicle is parked or in an emergency, said lever 4 being secured in set position by the pawl 8 engaged with the ratchet 3. Should an attempt be made to put the vehicle in motion without first releasing the hand brake the arm 11, through the medium of the lever 10, the flexible cable 16, the coupling 21, etc., will be actuated as the clutch pedal is depressed for disengaging the pawl 8 from the ratchet 3 thereby releasing the hand lever 4. The construction of the coupling 21 is such that a yieldable connection is provided between the clutch pedal 20 and the flexible cable 16. Of course, the hand brakes may be manually released in the usual manner. However, should the operator forget to do this it will be readily apparent that the hand brakes will be automatically released by the apparatus constituting the present invention.

It is believed that the many advantages of a brake release constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. In a brake release for motor vehicles of the type including a clutch pedal, a ratchet, a hand brake lever, and a pawl pivotally mounted on said hand brake lever and engageable with the ratchet for securing said hand brake lever in set position, a releasing lever pivotally mounted on the hand lever, means operatively connecting said releasing lever to the pawl for disengaging said pawl from the ratchet, and means operatively connecting the releasing lever to the clutch pedal for actuation thereby when said clutch pedal is depressed.

2. In combination with a motor vehicle including a clutch pedal, a hand brake lever, a ratchet and a pawl pivotally mounted on the hand brake lever and engageable with said ratchet for releasably securing said hand brake lever in set position, a releasing lever pivotally mounted on the hand brake lever, an arm projecting at an angle from said releasing lever, means operatively connecting said arm to the pawl for disengaging said pawl from the ratchet when the releasing lever is actuated, and a flexible cable operatively connecting the releasing lever to the clutch pedal for actuation thereby when said clutch pedal is depressed.

3. In combination with a motor vehicle including a clutch pedal, a hand brake lever, a ratchet and a pawl pivotally mounted on the hand brake lever and operatively engageable with said ratchet for releasably securing said hand brake lever in set position, a releasing lever pivotally mounted on the hand brake lever, means operatively connecting said releasing lever to the pawl for disengaging said pawl from the ratchet, a flexible cable connected to the releasing lever, and a coupling connecting the flexible cable to the clutch pedal for actuation thereby when said clutch pedal is depressed, said coupling including a clevis pivotally connected to the clutch pedal, a rod mounted in said clevis and extending slidably through the closed end thereof, a head on the outer end of the rod engageable with the closed end of the clevis and in which the flexible cable is anchored, a nut threadedly mounted on the inner end portion of the rod, and a coil spring encircling said rod and having one end engaged with the closed end of the clevis and its other end engaged with said nut.

LEO F. WENDEL.